Patented Apr. 22, 1941

2,238,949

UNITED STATES PATENT OFFICE 2,238,949

PROCESS OF MODIFYING THE ELECTRO-CHEMICAL PROPERTIES OF SHAPED ARTICLES

Paul Schlack, Berlin-Treptow, Germany, assignor, by mesne assignments, to Walther H. Duisberg, New York, N. Y.

No Drawing. Application February 3, 1937, Serial No. 123,867. In Germany February 6, 1936

4 Claims. (Cl. 8—113)

My present invention relates to the manufacture of shaped articles.

One of its objects is a process of modifying the affinity of shaped articles containing nitrogen. Another object are the shaped articles obtained according to this process. Further objects will be seen from the detailed specification following hereafter.

It has already been proposed in my co-pending applications Ser. No. 40,352 filed Sept. 12, 1935, Pat. No. 2,131,145, Ser. No. 53,004 filed December 5, 1935, Pat. No. 2,131,146, and 64,776, Pat. No. 2,183,754, to modify the electrochemical character, especially the basic properties, of natural or artificial articles, especially fiber materials containing basic or also acid groups by a treatment with alkylating agents.

This invention relates to a treatment of natural materials or shaped artificial materials consisting of or comprising protein substances or derivatives thereof or other substances of high molecular weight and containing basic amino- or imino-groups with a substance which has a tendency to react with basic amino- or imino-groups with the formation of residues containing the group

one bond between C and N being unsaturated. Such treatment has for its object the change in the chemical character and therewith the affinity of the material for various agents, for instance dyestuffs, dyestuff components, mordants, loading agents or agents for combating pests.

Suitable for the present purpose are compounds which react with amino- or imino-groups to form cyanamides, amidines or guanidines respectively. Speaking generally, substances suitable for treating the material in accordance with the invention are those which by simple addition to the amino- or imino-group or by condensation with elimination of hydrogen halide, sulfo-groups, alcohols, mercaptans, ammonia or amines are able to form the partially unsaturated group

substances of this kind are dicyanogen, cyanohalides and their polymerides, cyanamide and its dialkyl derivatives and tautomerides, cyclic and acyclic iso-urea ethers and iso-thiourea ethers, disulfides having the group $-N=C-S-S-$ and capable of being split by amines, imino-ethers and iminothio-ethers, particularly those having iminogroups in cyclic combination and cyclic and acyclic amidines having amino- or imino-groups which are easily exchanged. Numerous compounds of this type are enumerated further down.

Since the reactions involved occur in a heterogeneous system their initiation and more or less smooth progress depend in considerable degree on the prevailing working conditions, the nature of the components, the swollen condition of the latter, the presence of compounds capable of accelerating the reaction, the solubility of the reacting materials in the solvents employed and their tendency to secondary reactions, particularly to polymerization.

It is therefore necessary in each case to determine the usefulness of the substances which tend to form an amidine or cyanamide for the substratum in question and to decide upon the most favorable conditions of reaction. Relatively small differences in constitution of the reacting substances may influence the result considerably. For example, the 2-amino-5-methyloxazoline easily obtainable by addition of 1:2-propylene oxide to cyanamide produces on wool only a comparatively feeble but still undoubted effect, whereas the 2-amino-5-chloromethyloxazoline obtainable in like manner from 1:2-epichlorhydrin has a very strong effect.

The active substance may contain besides the groups specific for the formation of amidines other substitutents, for example hydrophil residues which bring about solubility in water or residues which increase the affinity or substantivity to the substratum or which in addition to influencing the agent in hydrophil character also affect the affinity relationship of the goods treated by the specific electrochemical character of the substituting groups; finally residues which produce subsequent changes, for example substitutions in the goods treated. Residues coming into consideration are, for example, carboxyl groups, sulfo-groups, amine residues or ammonium residues, halogen alkyl groups, halogen hydroxyalkyl groups, thiocarbamide residues, thio-urethane residues, hydroxyalkyl residues. The substituents introduced may also contain any chromophore or chromogen, as for instance enols or aromatic nuclei capable of passive coupling, or even residues which have a specific protective effect against textile pests, for example moth larvae, moulds or the like.

If the substituents contain further reactive atoms or atom groupings these may be subjected to further reactions, for example they may be exchanged for basic or acid residues, residues of dyestuff components or of dyestuffs. In the last named case dyeings are produced of particularly good properties of fastness. After-treatment with, for example, an amine or an amino-acid also comes into question if the primary reaction product contains the amidine group still not in basic form even if pre-formed, for example in the case of the action of dicyanogen or polymeric cyanogen halide. The products thus produced have, however, frequently the tendency of themselves to undergo secondary reactions, becoming basic substances. Cyanamide groups may also be transformed into thiourea groups by treatment with ammonium sulfide, whereafter the substrate may be dyed according to my co-pending application 64,776 filed February 19, 1936, in the presence of alkylating agents which react to form isothiourea ether-groups.

For avoiding damage to fibers protective agents of known kind may be used provided that they do not enter into undesired by-reactions with the active materials. The process may be conducted in the presence of oxydizing or reducing bleaching agents in order to counteract a tendency which may occur in some cases towards yellowing or in order to bleach the raw material simultaneously with improving it.

If the substance which has a tendency to amidine formation is a strong base, it is advantageous and in many cases may be necessary to bring it into action in the form of its salt with an inorganic or organic acid, for instance hydrochloric acid, hydrosulfocyanic acid, acetic acid, tartaric acid, citric acid, salicylic acid or toluene sulfonic acid. Instead of these acids there may be used one having a capillary active anion, for example tetrahydronaphtalene sulfonic acid or dodecyl sulfonic acid. The base may be only partly saturated with the acid. Also the substrate may be pre-treated with acids or acid salts, as for instance trichloracetic acid, hydrogen chloride, zinc-chloride, zinctetrachloride, aluminium-chloride or boron fluoride, if necessary under exclusion of water, for instance with the reaction with cyanamides. According to the stability and reactivity of the reacting substances it may be preferable, for instance, if the amidine former or the reactive groups of the substratum are present in the form of slowly reacting salts, to conduct the reaction in presence of an agent which binds acid or a buffer agent, for example in presence of sodium acetate, borax, disodium phosphate or an alkali salt of a dialkyl aminoacetic acid. In the most cases such additions are not necessary. The reaction may be more or less considerably reinforced or facilitated by pre-treating the substratum with an agent which lends it reactivity or loosens its structure or causes it to swell or by an addition of such a swelling agent to the treating agent. For example, the reactivity of wool may be considerably increased by a mild chlorination, by a preliminary boiling with a solution of a sulfocyanide or by preliminary oxidation with hydrogen peroxide.

Suitable swelling agents are for example urea, thiourea, formamide, resorcinol, glycol, mannite, potassium sulfocyanide or an alkali salicylate. Moreover, a suitable choice of the anion when a salt of the amidine former is used may affect the degree of swelling. Swelling agents may be used with special advantage if the reacting substances are of comparatively high molecular weight and therefore are not able to penetrate into the goods to be treated. For some reactions the application of the known specific catalysts, for instance copper-salts for the reaction with dicyandiamides may be recommended.

The structure may be treated before or after, if necessary also during the dyeing operation with solutions of the active substances in water or organic solvents in which latter case a closed apparatus is used, for instance a closed dyeing apparatus or an apparatus such as is used for dry cleaning processes. It is simpler to impregnate the goods with solutions of reagents in water or organic solvents, for instance methanol, butanol, carbontetrachloride, toluene, cyclohexanone, epichlorhydrin, to centrifuge or squeeze them and then, in the case of fabrics, to store them, for example in rolled up condition at a suitable temperature and humidity or to slowly rotate them on rollers until the desired effect is produced. In general temperatures between 40 and 80° C. are suitable. In the case of products which are comparatively stable to heat, for instance artificial fibers with a cellulose basis or natural silk, the temperature may be over 100° C. Also wool, especially in an acid condition or in the presence of agents becoming acid especially in the absence of moisture, may be heated to temperatures above 100° C. Temperatures above 140° C. ought to be avoided, at least the time of reaction ought to be shortened as much as possible in these cases. Sufficiently volatile substances, for example halogencyanide, reactive imino-ethers, may be used in the form of vapor for the treatment, if desired under diminished pressure or with rhythmic oscillations of pressure.

In order to avoid any damage of the fiber protecting agents of known type may be added provided that they do not give undesired secondary reactions with the treating agents. Also the right adjustment of the degree of swelling is of importance in this connection. If alkaline substances are used, the degree of swelling, for instance of wool must be kept rather low. Furthermore it is possible to work in the presence of bleaching agents, especially those having a reducing action, in order to obviate from case to case a tendency to yellowing or in order to obtain a bleaching simultaneously with the improvement of the raw materials.

Local application of the agent by the methods known in printing is possible. The general or local treatment may be conducted in the presence of dyestuffs, dyestuff intermediate products and/or other treating agents, for example mordants. So also any other operation usual in the textile industry for imparting effects, for example reserve printing, may find application.

The process is primarily applicable to raw materials of animal origin, particularly natural or artificial fibers. As examples may be cited wool, chlorinated wool, wool which has been pre-treated with alkali, a salt having alkaline reaction, potassium sulfocyanide or hydrogen peroxide, loaded or non-loaded natural silk, fibroin artificial silk, casein artificial silk, feathers, bristles, pelts, felts, horn, tanned or non-tanned hides. It may, however, be applied without alteration to many other products of a synthetic or semi-synthetic nature which contain residues having reactive amino- or imino-groups, for instance cellulose derivatives or polymerizates in which nitrogeneous residues having at the basic nitrogen hydrogen capable of exchange, for example in the form of basic ester groups, ether groups or amide groups, have been introduced. Also such materials may be used as contain, besides, for example cellulose, proteins or protein derivatives, for instance casein or basic artificial resins, as for instance alkylene polyamines, the products obtained by the reaction of polyglycidtoluenesulfoester with mono- or poly-valent amines and other known products, for instance those enumerated in my co-pending applications Ser. No. 47,638 filed Oct. 31, 1935, and 64,776 filed February 19, 1936, which have been introduced for the purpose of animalizing the materials. In this manner not only can dyeing effects be improved, but the fixation of the added substance may be enhanced. This happens for instance when the reacting components contain atoms or atom groups which have a tendency to enter into the cellulose molecule. When the entering groups contain aliphatic, araliphatic or alicyclic residues with more than 8 carbon atoms in a chain there may be attained together with the change of the affinity relationships a permanent softening effect, for example an acquired hydrophobe character.

It is not unconditionally necessary that the active substance should be introduced in preformed condition. It may be produced on or in presence of the material to be treated by chemical reaction or decomposition. Thus wool may be treated with an alkyl thiourea in presence of a desulfurizing agent which brings about cyanamide formation. Further, wool which is impregnated with an alkyl thiourea may be after-treated with an alkylating agent, such as sodium chloracetate, ethyl bromide, ethane sulfonic acid methyl ester, toluene sulfonic acid methyl ester or mono- or dichlorhydrin or the fiber may be padded simultaneously with a mixture of thiourea and a reactive halogen compound. There may be mentioned here the treatment of wool with a thiourea of the fatty series, for example with a thiourea from dodecylamine and methyl mustard oil or allyl mustard oil and its final treatment with an alkylating agent, for instance ethyl bromide. Compounds which easily suffer scission useful for this process are also the bodies produced by the action of mustard oils or isocyanates on cyanamide or condensation products of cyanamides with carbonyl compounds, for example ethyl acetoacetate. Finally the reactive structures may be treated simultaneously with mustard oils, for instance methyl mustard-oil in the presence of alkylating agents, for instance benzylchloride, or there may be applied mustard oils which by themselves have alkylating functions, for instance $\beta$-$\gamma$-dibrompropyl mustard-oil.

The additional formation of amidine or guanidine groups, for instance on wool, renders possible also a more intense after-treatment with agents which act exclusively or chiefly on the changed basic groups. For example, the condensation with carbonyl compounds such as formaldehyde, chloral, chloracetaldehyde, $\alpha$-$\alpha'$-dichlordimethylether, heptyl aldehyde, dodecyl aldehyde, glyoxal, diacetyl, benzoin, acetylacetone, ethyl acetoacetate and derivatives of such substances; furthermore, the condensation with methylol compounds of amines and amides, for instance with dimethylaminomethanol, dimethylol urea, methylol derivatives or cyanuric acids and of amino-1:3:5-triazine. Such condensations may occur in presence of further bodies which react with carbonyl compounds, especially of amides or phenols, for instance of urea, dicyandiamide, thiourea, toluene sulfamide, phenol or the like and/or in presence of an inorganic or organic basic or acid substance. The action of the amidine former may also occur with the simultaneous presence of substances of this kind.

Moreover, if no direct reaction with the amidine former is to be expected, there may be brought into action at the same time, previously or subsequently any alkylating agents or substance which under the conditions of reaction form alkylating agents, particularly one which contains a basic residue. To name some of these:— ethyl bromide, ethyl iodide, p-toluene sulfonic acid methyl ester, allylbromide, 1.4-dichlorbutene 2.3, vinyl chloracetate, $\alpha$-$\beta$-dichlordiethyl-ether, chloracetone, 1:3-dichloracetone, diazo-paraffins, ethylene oxide, 1.2-propylene oxide, 1.2-propylene-sulfide, epichlorhydrin, epibromhydrin, epidichlorhydrin, 1.2-epoxybutene, tetrachlorhydroxypropylammonium chloride, the addition product of 2 mol ethyl bromide and N.N'-dihydroxy-ethylpiperazine which when heated dissociates under rupture of the ring, 3.4-piperidopropene oxide, 2.3-epoxy-propyltrimethylammonium chloride, N-butylethylene imine, diethylethylene iminium chloride, the quaternary salt from 1 mol. piperazine and 2 mol. epichlorhydrin as well as mixtures of such compounds as far as they do not react with each other under formation of inactive products.

By this treatment which may be applied not only to individual materials, but also to mixed goods, particularly to materials in any stage of preparation and improvement, the chemical behaviour of the material is more or less profoundly varied according to the choice of the agent and the conditions of operation. The affinity for dyestuffs, dyestuff derivatives or dyestuff components having acid groups as well as for other acid treating agents is as a rule considerably increased. If the acting substances contain acid groups the affinity for basic dyestuffs may be raised, especially if sulfo-groups are in question, in which cases no reservage action takes place. The inactivation of basic groups which takes place if wool which has been pre-treated with aqueous alkali is reacted with cyanurchloride or similarly constituted polyhalogen compounds is not subject matter of the present invention. The increase in the reactivity of the treated substances makes it possible to reduce the dyeing temperature which, for example in mixtures of artificial fibres from cellulose derivaties, is very desirable. Mostly there is obtained simultaneously with the improvement of the affinity also a considerable enhancement of the fastness of the dyeings. The same may be said for the fixation of tanning agents, moth protective agents, reserving agents and loading agents. Also the resistance to alkaline agents may be considerably improved, especially if the acting substance or a component thereof has two or more reactive positions in the molecule. The change in the chemical behaviour may be used with advantage for producing effects. By working together of pre-treated and not pre-treated material, strong varied multi-color effects or tone-in-tone effects may be obtained.

A number of the substances applicable for the process of this invention are named in the Examples set forth hereinafter. Others may be gathered from the following list. However, the latter is not exhaustive and only serves to show what individual compounds or types of compound come into question: cyanchloride, cyanbromide, cyanurchloride, cyanurbromide, cyanurdichlormonoamide, dichlorpyridazine, dichlorphthalazine, cyanamide, ethylcyanamide, butylcyanamide, cyclohexylcyanamide, dodecylcyanamide, abietylcyanamide, N-cyantaurine, 3-cyanamidobenzoic acid, sodium-4-cyanamidobenzosulfonate, salts of succincyanamide acids, 2-dimethylaminophenylcyanamide (azo-component), dicyandiamide, cyanurea, dipropylcarbodiimide, combination of cyanbromide and diethylaminoacetonnitrile, combination of cyanbromide and N-N'-di-$\beta$-chlorethylpiperazine, methylisothiourea acetate, reaction product from two mols of N-trimethylthiourea and 1 mol 1.4-dichlorbutene-2.3, N-o-dimethylamino-p-phenyl -N'- allyl-methylisothioureamethosulfate, addition product of ethylchlorhydrin and thiocarbaminylmethyltaurine, addition product of ethylbromide and guanylthiourea, combination from S-methyl-N-N'-trimethylthiourea, guanidinsulfocyanide, β-chlorethylsulfocyanide, γ-chlorpropylsulfocyanide, benzylsulfocyanide, m-xylylenedisulfocyanide, the reaction product from di-β-chlorethylethylamine and two mols of potassium sulfocyanide, dodecylsulfocyanide, ethylisonitrile, β-γ-dibrompropyl mustard oil, β-γ-dibrompropylthiourea and its re-arrangement product, acetiminoethylether, acetiminothiohydroxyethylether, glutaric acid diiminoethylether, terephthalic acid diiminoethylether, 2-hydroxymethylthiazole, benzothiazole-2-sulfonic acid, halogenpyridinosulfonic acids, 2-methoxypyridino iodine methylate, 3.5-dichlor-N-methylpyridinium-2-sulfonic acid betaine, trichloracetonitrile, malonitrile, condensation product from malonitrile, formaldehyde and dimethylamine and its methyl iodide.

The quantity of the reacting substances or mixture of substances respectively may vary in wide limits. It is of course dependent to an essential degree on the property of the substrate, on the reactivity of the treating agents, on the special working conditions, on the temperature and the time of reaction. In view of these great differences applicable rules cannot be given. With highly active agents of comparatively low molecular weight strong effects may be obtained already with very small quantities, for instance with 3 to 5% of the weight of the goods to be treated in the case of cyanchloride. When working with solutions it is generally preferably to apply a greater surplus, since in this case the components which have taken part in the reaction may easily be recovered. For sparing the goods to be treated, the temperature of reaction and the time of reaction may be lowered.

The limitation of the working conditions by the capacity of resistance of the substrate against heat, acid or alkalis has already been indicated above. It goes without saying that some reactions, as for instance such which are accompanied by a strong alkaline reaction are not applicable or only applicable to a limited degree with delicate fibers, for instance with wool, whereas on the other hand reactions which take place in a strongly acid area, for instance under splitting off of hydrogen chloride, may cause damage to cellulose material and therefore have to be carried through with precaution, if necessary in the complete absence of water. In dubious cases the right conditions may easily be found by a few comparative experiments.

The following examples illustrates the invention:

(1) A zephyr yarn is impregnated for 20 minutes at room temperature with an aqueous solution of 10 per cent strength of S-hydroxyethyl-μ-mercaptodihydro-glyoxaline hydrochloride; it is then centrifuged and suspended in hanks for 16 hours at 70° C. at 75 per cent relative humidity. The externally unchanged yarn adsorbs dyestuffs having acid groups, for instance Alizarine Direct Blue A (Schultz Farbstofftabellen, 7th edition, vol. II, page 9), Thiazine Red R (Schultz Farbstofftabellen, 7th edition, vol. I, page 121) or the like, considerably more strongly than does the untreated yarn. It is remarkable and important that the effect is produced both in dyeing in a neutral bath and in dyeing in an acid bath.

(2) A mixed fabric of wool and acetate artificial silk is impregnated with a solution of 8 per cent strength of 2-amino-5-chloromethyloxazoline-(2:3) in 50 per cent of methanol and the well squeezed material is stored in a rolled up condition for 16 hours at 70° C. and 75 per cent relative humidity. The affinity for acid dyestuffs is quite considerably increased so that the fabric may be dyed in a neutral bath with otherwise little suitable or unsuitable dyestuffs for wool without damage to the acetate at a low temperature in deep tints. Instead of free base the salt thereof may be used; however, the effects of the free base are stronger.

(3) Wool is impregnated with an n/1 solution of the reaction product of N-omega-diethylamino-n-propyl-N'-allylthiourea hydrochloride with ethylene chlorhydrin and after centrifuging is heated for 14 hours to 60° C. at 75 per cent relative humidity. The wool which has been scarcely yellowed by this treatment is dyed together with non-treated wool with Alizarine Direct Blue A (Schultz Farbstofftabellen, 7th edition, vol. II, page 9) in a neutral bath at 90° C. The treated material is dyed darker than the untreated.

(4) Dry wool is heated with a solution in butanol of 5 per cent strength of acetiminoethyl ether for 6 hours at 100° C. and 75 per cent relative humidity. The wool treated in this manner is dyed especially in a neutral bath with Alizarine Direct Blue A (Schultz Farbstofftabellen, 7th edition, vol. II, page 9) more deeply than is untreated wool.

(5) Wool is impregnated with a hot aqueous solution of 10 per cent strength of ethylene thiourea and then treated at 60° C. and 92 per cent humidity moisture with 15 per cent of ethylbromide vapor. Even in a neutral bath the wool thus treated adsorbs many acid dyestuffs considerably better than untreated wool does. The fastness of the dyeings, for example that with Amidonaphtol Red BB (Schultz Farbstofftabellen, 7th edition, vol. I, page 58) is markedly improved.

(6) Wool material is padded with a solution of equimolecular proportions of ethylene thiourea and β-chlorethyldiethylamine hydrochloride, squeezed, rolled up and stored overnight at 92 per cent relative humidity and 75° C. The dyeing properties of the wool are improved in manner similar to that described in the preceding example.

(7) Wool is padded with the isothiourea ether salt from 1 mol 1:3-propylene bromide and 2 mols ethylene-thiourea in a solution of 10 per cent strength. The impregnated material is heated for 12 hours at 60° C. and 92 per cent relative humidity.

(8) Natural silk is treated as described in Example 2. The dyeing capacity is improved.

(9) The wool is boiled for 3 hours with 8 per cent of its weight of malonitrile in methanol in presence of 2 per cent of potassium acetate. The condensation with malonitrile presumably at the arginine residue may easily be detected by means of reagents which react with methylene-groups, for instance with dimethylaminobenzaldehyde. There is obtained with these latter an intensive yellow dyeing fast to washing.

(10) Viscose artificial silk is animalized by the action of ethylene imine and is then treated as described in Example 2. The dyeing capacity and the fastness of the dyeings are improved. This product has become similar to wool in dyeing relationship.

(11) Films from cellulose-methyl-para-nitrobenzyl ether are suspended after reduction of the nitro-groups for 12 hours above 15 per cent of their weight of benziminomethyl ether at 75 per cent relative humidity. The affinity for acid dyestuffs which before treatment was only feeble is now strongly pronounced.

(12) Wool which has been dyed with 3 per cent of its weight of Amidonaphtol Red BB (Schultz Farbstofftabellen, 7th edition, vol. I, page 58) is impregnated with an aqueous solution of 10 per cent strength of S-hydroxyethyl-$\mu$-mercaptodihydroglyoxalene hydrochloride, then centrifuged and stored for 12 hours at 50° C. in the presence of 10 per cent of its weight of propylene oxide (vapor). The fastness of the dyeing is considerably improved.

(13) Dry wool is heated with 10 per cent of its weight of cyanuric chloride in acetone (liquor ratio 1:20) for 6 hours in a closed vessel at 60° C. After cooling the acetone is separated by squeezing and the residue is expelled by means of hot air. The goods, which if desired may be rinsed with water, may be dyed in normal manner, but show an essentially enhanced resistance to alkali. The effect can be further enhanced if simultaneously an alkylating agent, for example butadiene dioxide or epichlorhydrin, is brought into action. Other suitable solvents are dioxane or carbontetrachloride. The temperature may be raised to 100° C.

(14) An artificial silk from cellulose-ethylpara-nitrobenzyl ether is treated after reduction of the nitro-groups with a neutral dye bath which contains besides 3 per cent of Alizarine Direct Blue A (Schultz Farbstofftabellen, 7th edition, appendix, page 62) 10 per cent of benziminomethyl ether dispersed by means of oleyl polyglycol. The goods are treated first for 1 hour at 60–85° C. and then some acetic acid is added gradually. There is obtained a strong blue dyeing.

(15) Italian casein-wool (Lanital) is heated for 6 hours at 70° C. with a 4 per cent solution in 1.4-dioxane of cyanbromide in a closed vessel. The affinity of the material to acid dyestuffs and acid dyestuffs capable of reacting with chromium compounds, as for instance Amidonaphtol Red BB (Schultz Farbstofftabellen, 7th edition, vol. II, page 187) or Acid Anthracene Brown KE (Schultz Farbstofftabellen, 7th edition, vol. II, page 187) is enhanced and the fastness of the dyeing to water, washing and milling is improved.

(16) Casein-wool having been suspended in hanks in vapor of 10 per cent epichlorhydrin calculated on the weight of the fibre for 14 hours at 50° C. and at 35 per cent relative atmospheric moisture in a closed vessel, having a volume of 40 cc. per 1 gram of fiber material, is after-treated with a solution of cyanbromide in 1.4-dioxane as described in Example 15. The dyeing produced on this material, for instance Amidonaphtol Red BB (Schultz Farbstofftabellen, 7th edition, vol. I, page 58) is further improved as regards its fastness. As the tenacity of Lanital in wet condition is improved by this treatment, the goods leave the dyeing process in a better condition than non-pretreated materials.

(17) Viscose artificial silk which contains 6 per cent of the not volatile polymeric ethyleneimines from the reaction of ammonia with ethylene chloride is heated for 6 hours at 100° C. in 15 parts of carbontetrachloride with 20 per cent of the weight of the goods of di-$\beta$-chloroethylcyanamide. The basic character of the material is substantially raised and the fastness of the dyeings is improved. There are also obtained good results if the di-$\beta$-chloroethylcyanamide is wholly replaced by dodecylcyanamide or methyl-dodecylcyanamide. The cyanamides may be obtained according to the classic method of desulfurization of the corresponding thioureas or according to the cyan halide method.

(18) Wool is heated for 6 hours at 70° C. with 20 per cent of the weight of wool of the mixture of the products obtained from the reaction of N-di-n-propylbenzylamine and cyanbromide (Braun und Röver, Berichte der Deutschen Chemischen Gesellschaft, 36, 1198), in an evacuated vessel having a volume of 50 cc. per 1 gram of wool.

(19) Wool is heated for 6 hours at 100° C. in a butanol solution of ethyl-$\epsilon$-brom-n-amyl-cyanamide (Braun, Berichte der Deutschen Chemischen Gesellschaft, 42, 2053). The treated wool is intensively dyed with acid dyestuffs.

(20) Wool is heated for 8 hours at 50° C. with a 5 per cent ethanol solution of the product obtained from the reaction of cyanbromide with di-$\beta$-bromethylamine in acetone. After the squeezing and evaporation it is treated with vapor for 20 minutes.

(21) Chlorhydroxypropylpiperidine is united with cyanbromide. Wool is heated for 12 hours at 70° C. with a 4 per cent solution of the reaction product in dioxane.

(22) A viscose artificial silk which has been aminated with ethyleneimine is impregnated with a 30 per cent solution of potassium cyanide in the cold and then after-treated while cooling with a solution of bromine in carbontetrachloride at 5 to 10° C. The bromine is applied in such a quantity that the fiber material is always alkaline. Subsequently the silk is after-treated with a 1 per cent aqueous solution of $\beta$-amino-ethylamino acetic acid for ½ hour at 20 to 50° C.

(23) Diethylaminoacetonitrile is united with the equivalent quantity of cyanbromide and the mixture of the reaction product (ethylbromide, diethyl cyanamide, bromacetonitrile) is reacted for 14 hours at 70° C. in a closed vessel (volume of the vessel 40 cc. per 1 gram of wool) with the five-fold quantity of wool at a relative humidity of 45 per cent. The treated material adsorbs acid dyestuffs essentially easier. Instead of the diethylaminoacetonitrile there may be used with the same result diethylamino acetic acid methyl ester.

(24) A mixed fabric of wool and viscose silk of wool-like character aminated with ethylene imine is padded in a solution which contains 60 grams of Chinoline Yellow S Extra (Schultz Farbstofftabellen, 7th edition, vol. I, page 392) and 100 grams of thiourea per 1 liter. The pre-dried goods are subsequently stored in the vapor of 15 per cent of benzyl chloride or 1.5-dibrompentane or 1.4-dichlorbutene-2.3 for 14 hours at 70° C. and 35 per cent of relative humidity, finally damped for 20 minutes. The dyeings are uniform, fast to washing and to water.

(25) Viscose artificial silk which has been aminated with ethyleneimine according to the process of the application Ser. No. 35,402 filed Aug. 8, 1935, is heated at 80° C. for 14 hours in the vapor of 15 per cent of O-ethyl-N-N-di-n-propylisourea in a vessel which was evacuated before the introduction of the base. There are obtained faster and deeper dyeings with acid dyestuffs, especially with dyestuffs capable of being reacted with chromium salts.

(26) Wool treated with 3 per cent Alizarincyaningreen G extra (Schultz Farbstofftabellen, 7th edition, vol. I, page 532) is heated with 5 per cent of cyanbromide vapor for 8 hours at 60° C. in a vessel having a volume of about 25 cc. per 1 gram of wool. The fastness of the dyeings to washing is improved.

(27) Wool which has been damped out with carbontetrachloride for removing the moisture is impregnated in a closed vessel with a solution which contains 10 per cent of propylisonitrile (related to the wool) and the equivalent quantity of bromine (1 mol per 1 mol of nitrile). This solution is caused to react for 1 hour at room temperature, then heated to 80° C. and the reaction is continued for three hours at this temperature. After squeezing the goods are after-treated for half an hour at room temperature with fresh carbontetrachloride which contains 1 per cent of cyclohexylamine. The fiber is freed from the solvent and washed and shows improved dyeing properties.

(28) Viscose artificial silk contains a mixture of highly polymeric ethyleneamine bases in such a quantity that the nitrogen content amounts to 1.5 per cent, is heated for 12 hours at 80° C. in carbontetrachloride (liquor ratio 1:20) with a mixture of 10 per cent of diphenylcarbodiimide and 10 per cent 1.4-dichlobutene. The absorption of the basic component is improved and the affinity to acid dyestuffs is raised.

(29) Wool-yarn is dried and thereafter heated for 6 hours at 100° C. in a 5 per cent solution of benzylsulfocyanide in butanol (liquor ratio 1:20). By this treatment only a slight change of the tone of dyeing takes place. The yarn subsequently dyed with 3 per cent Amidonaphthol Red BB (Schultz Farbstofftabellen, 7th edition, vol. I, page 58) with an addition of acetic acid at 85 to 95° C. has a better fastness to water and washing than a material dyed in the same manner which has not been pre-treated with benzylsulfocyanide. An improvement in the fastness is also obtained if the treatment with the benzylsulfocyanide takes place after the dyeing process.

(30) Wool containing about 1 per cent of aluminium-chloride is introduced in a condition free from water in a 2 per cent solution of dipropylcarbodiimide in di-n-butylether. This solution is heated for 6 hours to 90 to 100° C., whereafter the goods are squeezed and washed with water which contains 2 grams of sodium-oleyl-methyltaurine per liter. The dyeing qualities of the fiber are improved.

(31) Wool containing 1 per cent of dry aluminium-chloride is heated at 70° C. for 3 hours and at 100° C. for 3 hours in 20 parts of dioxane with 15 per cent of the weight of wool of 1.4-disulfocyanbutene-2.3, which is obtained by heating 1.4-dichlorbutene-2.3 with potassiumsulfocyanide in alcohol. The dyeings with acid dyestuffs, for instance with Amidonaphthol-Red BB (Schultz Farbstofftabellen, 7th edition, vol. I, page 58), on the material treated in this manner have an improved fastness to water and washing.

(32) Viscose artificial fiber which has been aminated according to the process of the application Ser. No. 35,402 filed Aug. 8, 1935, with ethyleneimine (nitrogen content about 2 per cent) after a pre-treatment with diluted sodium hydroxide solution is treated with an acetonic solution of 20 per cent cyanbromide (related to the weight of the fiber) at first for half an hour at room temperature and then for 2 hours at 40° C. The silk is subsequently thoroughly washed and shows an increase in the affinity and a considerable improvement of the properties of fastness.

The dyeing capacity of the silk can be modified by after-treatment of the fiber with a 5 per cent solution of ammonium sulfide for 2 hours at 60 to 70° C. in a closed vessel. The product then contains thiourea groups besides basic groups. The fastness of acid dyeings, for instance with 3 per cent Supranolbrilliantred 3 B (Schultz Farbstofftabellen, 7th edition, vol. II, page 204) on this fiber is very satisfactory. In this case also the process of the simultaneous dyeing and alkylation according to my co-pending application 64,776 filed February 19, 1936, may be applied. A particularly suitable alkylating agent is for instance bromacetyl-3-methyl-piperidide.

The fastness of the dyeings on the silk treated with cyanbromide as described above may be still further improved if the goods which are treated with an acid (oxalic acid, tartaric acid or sulfuric acid), are after-treated with trimethylol-1.3.5-triamino-triazine. The goods are impregnated with a 5 per cent aqueous solution of this body dried at 60 to 80° C. and hardened for some minutes at 120 to 130° C. The fiber may also be impregnated with a solution of formaldehyde and then padded with an acid solution of triaminotriazine and then dried and heated.

(33) Wool which has been dyed with 3 per cent of acid Anthracene Red 5 BL (Schultz Farbstofftabellen, 7th edition, addendum, page 125) and has been dried, is heated for 6 hours at 100° C. in the fifteen-fold quantity of weight of a 2½ per cent solution of β-γ-dibrompropyl mustard-oil in dioxane. Subsequently the wool is squeezed and washed at 40° C. with 2 grams of oleyl polyglycol per liter. The treated dyeings resist a sharp washing with soap, soda at 80° C. very well, whereas the same dyeings on the ordinary wool are dissolved for the greatest part.

Also if undyed wool is treated in the above indicated manner and only dyed after this treatment, an essential improvement of the fastness to washing is obtained.

It can be supposed that di-brompropyl mustard-oil is at first added to amino-groups under formation of the corresponding thiourea, whereafter the known re-arrangement to form brommethyl-aminothiazoline takes place. It is uncertain whether and to what degree further reactions takes place, as for instance with the methyl bromide group or reactions with the carboxyl groups of the wool.

The effect is still further enhanced if the dibrompropyl mustard-oil is brought to reaction in a mixture with epichlorhydrin.

(34) A wool yarn dyed with 3 per cent of Alizarinecyanine Green G Extra (Schultz Farbstofftabellen, 7th edition, vol. I, page 532) is heated for 5 hours at 100° C. in a dry condition in 18 parts by weight of butanol which contains 3 per cent of guanidinesulfocyanide and 1 per cent of α-β-dichlorethyl ether. By this treatment the fastness of the dyeings is improved.

(35) Wool yarn dyed with 3 per cent of Alizarinecyanine Green G Extra (Schultz Farbstofftabellen, 7th edition, vol. I, page 532) is heated at first for 2 hours at 40 to 50° C. and then for 4 hours at 80 to 100° C. with a solution of 20 per cent dicyandiamide and 10 per cent of α-α'-dichlordimethylether in butanol. The fastness of the dyeings is improved.

(36) Dry wool containing about 1 per cent zinc-chloride is heated for 6 hours at 60 to 85° C. with a solution of 20 per cent of trichloracetonitrile (related to the weight of the wool) in dioxane, while avoiding any entrance of water. In the same manner also wool pre-treated with epichlorhydrin may be treated.

(37) Casein artificial fiber which has been acidified with diluted hydrochloric acid and which has been stored for 14 hours at 70° C. and 75 per cent of relative humidity in 25 per cent of epichlorhydrin (related to the weight of the artificial fiber) in a closed vessel (volume 40 cc. per 1 gram of artificial fiber) is immersed for half an hour in an ice-cold n/2 solution of sodium-cyanamide. It may be supposed that during this reaction the chlorhydroxypropylamino groups are transformed into aminooxazoline groups.

(38) An acetate artificial silk which was spun with an admixture of 10 per cent of benzenesulfopolyglycid and which was aminated by a treatment with 12 per cent of ethyleneimine (process according to my co-pending application Ser. No. 41,500 filed Sept. 20, 1935) is at first treated at 60° C. in a bath made alkaline with triethylamine with 5 per cent of the two-valent mustard-oil prepared from 1.5 diaminopentane. After the mustard-oil has been used up almost completely 4 per cent of β-bromethylaminehydrobromide and at the same time 3 per cent of Alizarinecyanine Green G Extra (Schultz Farbstofftabellen, 7th edition, vol. I, page 532) are added. The dyeing is finished at 75 to 80° C. after an addition of formic acid.

In this manner strong dyeings are obtained. The formation of amidine in this case is brought about in the same bath by two reactions which partly occur simultaneously. At first thiourea is formed which contains a free mustard-oil group. This reacts after addition of chloralkylamines partly with the thiourea group and partly with the mustard-oil group, in which two cases— in the first case directly and in the second case by secondary reaction—isothiourea-groups may be formed.

Instead of bromethylaminehydrobromide also bromacetdiethylamide or bromacet-β',β-diethylaminoethylaminehydrobromide or its dimethylsulfate addition product may be used.

(39) A viscose artificial silk which was aminated with ethyleneimine and which contains a content of partly primary, partly secondary and partly tertiary nitrogen of 1.8 per cent is treated at 40° C. with 5 per cent of the mustard oil mixture of partly hydrolized casein which was obtained by reaction of thiophosgene in an alkaline medium. At a reaction still weakly alkaline 5 per cent of chloracet-di-β-piperidoethylamine are added and the temperature is slowly raised to 50 to 75° C. Then the silk is washed and dyed with acid dyestuffs in the usual manner. According to the type and the quantity of the reacting components and according to the time of reaction the effect may be modified. The dyeings are essentially faster than those on the starting material. There may also be applied mixtures of different mustard oils whereat, at first the one or the other component and then the missing component are added. For instance an improvement of the fastness is obtained if before the reaction of the mustard oil mixture of peptides a dispersion of 3 per cent of cyclohexyl- or dodecyl-mustard-oil is used.

(40) The same silk as in Example 39 is treated with 3 per cent cyclohexyl mustard-oil and 3 per cent of dichloracetylpiperazine for 1 hour at 40 to 65° C. Subsequently the silk is dyed with 4 per cent of Alizarine Direct Blue A (Schultz Farbstofftabellen, 7th edition, vol. II, page 9) at 60 to 70° C. without an addition of acid. The dyeing liquor is completely exhausted.

What I claim is:

1. The process of increasing the basic character of fibrous materials and films comprising a material containing a radical selected from the group consisting of the imino- and amino groups, which process comprises reacting said fibrous materials and films with a compound selected from the group consisting of a cyclic isourea ether, an acyclic isourea ether, a cyclic isothiourea ether, and an acyclic isothiourea ether, whereby said compounds react with said imino- or amino-group of the fibrous materials or films to form a residue containing the group

2. The process of increasing the basic character of fibrous materials and films comprising a material containing a radical selected from the group consisting of the imino- and amino groups, which process comprises reacting said fibrous materials and films with a compound selected from the group consisting of a cyclic isourea ether, an acyclic isourea ether, a cyclic isothiourea ether, and an acyclic isothiourea ether, and treating said fibrous materials and films with an alkylating agent whereby said compounds react with said imino- or amino-group of the fibrous materials or films to form a residue containing the group

3. The process of increasing the basic character of fibrous materials and films comprising a material containing a radical selected from the group consisting of the imino- and amino groups, which process comprises reacting said fibrous materials and films with a compound selected from the group consisting of a cyclic isourea ether, an acyclic isourea ether, a cyclic isothiourea ether, and an acyclic isothiourea ether, said compounds being formed from their constituents during the treatment of the fibrous materials and films whereby said compounds react with said imino- or amino-group of the fibrous materials or films to form a residue containing the group

4. The process of increasing the basic character of fibrous materials and films comprising a material containing a radical selected from the group consisting of the imino- and amino groups, which process comprises reacting said fibrous materials and films with thiourea in the presence of an alkylating agent, whereby said compounds react with said imino- or amino-group of the fibrous materials or films to form a residue containing the group

PAUL SCHLACK.